US012708964B2

(12) United States Patent
Ghassemi-Armaki et al.

(10) Patent No.: US 12,708,964 B2
(45) Date of Patent: Aug. 18, 2026

(54) SYSTEMS AND METHODS FOR WELDING VEHICLE COMPONENT ASSEMBLIES

(71) Applicant: GM GLOBAL TECHNOLOGY OPERATIONS LLC, Detroit, MI (US)

(72) Inventors: Hassan Ghassemi-Armaki, Northville, MI (US); John Patrick Spicer, Plymouth, MI (US); Spyros P. Mellas, Waterford, MI (US); Mark Engel, Clay Township, MI (US); Miguel Arturo Saez, Clarkston, MI (US); Blair E. Carlson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 828 days.

(21) Appl. No.: 18/114,312

(22) Filed: Feb. 27, 2023

(65) Prior Publication Data

US 2024/0286232 A1 Aug. 29, 2024

(51) Int. Cl.

| | |
|---|---|
| ***B23K 31/00*** | (2006.01) |
| ***B23K 9/00*** | (2006.01) |
| ***B23K 9/095*** | (2006.01) |
| ***B23K 9/12*** | (2006.01) |
| ***B23K 31/02*** | (2006.01) |
| ***B23K 37/02*** | (2006.01) |
| ***B23K 101/00*** | (2006.01) |
| ***G05B 19/401*** | (2006.01) |

(52) U.S. Cl.

CPC .......... *B23K 31/003* (2013.01); *B23K 9/0026* (2013.01); *B23K 9/0953* (2013.01); *B23K 9/0956* (2013.01); *B23K 9/126* (2013.01); *B23K 31/006* (2013.01); *B23K 31/02* (2013.01); *B23K 37/0252* (2013.01); *B23K 37/0258* (2013.01); *G05B 19/401* (2013.01); *B23K 2101/006* (2018.08); *G05B 2219/37205* (2013.01); *G05B 2219/39406* (2013.01)

(58) Field of Classification Search

None

See application file for complete search history.

(56) References Cited

U.S. PATENT DOCUMENTS

2013/0060369 A1* 3/2013 Simard .............. G05B 19/4083 700/98
2016/0346860 A1* 12/2016 Flint .................... B23K 31/003
2021/0237200 A1* 8/2021 Wang ..................... B23K 9/173
2022/0318461 A1* 10/2022 Fleischer ................ G06F 30/15

(Continued)

*Primary Examiner* — John J Norton

(57) ABSTRACT

A system for welding vehicle component assemblies includes a measurement sensor configured to scan first and second vehicle components, a welding apparatus configured to weld the first vehicle component and the second vehicle component together, and at least one processor configured to execute computer-executable instructions to access scan data of the first and second vehicle components, generate a CAD model of an as-scanned assembly of the first and second vehicle components, obtain input parameters associated with one or more features of the first and second vehicle components, generate predicted optimal welding parameters, using the machine learning model, based on CAD model and the input parameters, and control the welding apparatus to perform at least one welding operation on the first and second vehicle components according to the predicted optimal welding parameters.

20 Claims, 5 Drawing Sheets

(56) References Cited

U.S. PATENT DOCUMENTS

| | | | | |
|---|---|---|---|---|
| 2022/0390920 | A1* | 12/2022 | Wang | G05B 19/4099 |
| 2022/0410402 | A1* | 12/2022 | Lonsberry | G06V 20/00 |
| 2023/0056400 | A1* | 2/2023 | Chakraborty | B23K 9/125 |
| 2024/0042614 | A1* | 2/2024 | Schwenker | B23K 31/02 |
| 2024/0424611 | A1* | 12/2024 | Ogata | B23K 9/127 |
| 2025/0319934 | A1* | 10/2025 | Tokita | B23K 31/12 |

* cited by examiner

SYSTEMS AND METHODS FOR WELDING VEHICLE COMPONENT ASSEMBLIES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for welding vehicle component assemblies. Automated welding systems are often used to weld vehicle components during a vehicle manufacturing and assembly process. Welding operations may cause distortion of vehicle components, and vehicle components used in the process may have slightly different dimensions due to manufacturing tolerances, etc.

SUMMARY

A system for welding vehicle component assemblies includes a measurement sensor configured to scan a first vehicle component and a second vehicle component on a mechanical handling device, a welding apparatus configured to weld the first vehicle component and the second vehicle component together, and memory configured to store a machine learning model configured to output predicted optimal welding parameters, virtual computer-aided design (CAD) design data for multiple vehicle components, and computer-executable instructions. The system includes at least one processor configured to execute the computer-executable instructions to access scan data of the first vehicle component and the second vehicle component from the measurement sensor, generate a CAD model of an as-scanned assembly of the first vehicle component and the second vehicle component according to the scan data, obtain input parameters for the machine learning model, the input parameters associated with one or more features of the first vehicle component and the second vehicle component, generate predicted optimal welding parameters, using the machine learning model, based on CAD model and the input parameters, and control the welding apparatus to perform at least one welding operation on the first vehicle component and the second vehicle component according to the predicted optimal welding parameters.

In other features, the at least one processor is configured to access a virtual design CAD assembly of the first vehicle component and the second vehicle component according to the CAD design data, and determine an adjusted CAD assembly based on a combination of the CAD model and the virtual design CAD assembly, the adjusted CAD assembly indicative of one or more manufacturing differences between the first vehicle component and a specified virtual design of the first vehicle component, and between the second vehicle component and a specified virtual design of the second vehicle component. Generating the predicted optimal welding parameters may include generating the predicted optimal welding parameters based on the adjusted CAD assembly.

In other features, the at least one processor is configured to model a predicted weld distortion of a welded assembly including the first vehicle component and the second vehicle component, after completion of the at least one welding operation, using finite element analysis.

In other features, the at least one processor is configured to compare the predicted weld distortion to one or more specified weld distortion thresholds, and controlling the welding apparatus includes controlling the welding apparatus to perform the at least one welding operation in response to the predicted weld distortion being less than the one or more specified weld distortion thresholds.

In other features, the at least one processor is configured to compare the predicted weld distortion to one or more specified weld distortion thresholds, obtain a set of alternative predicted optimal welding parameters from the machine learning model in response to the predicted weld distortion being greater than the one or more specified weld distortion thresholds, and in response to a number of multiple sets of alternative predicated optimal welding parameters being equal to a specified iteration value, determine which one of the multiple sets of alternative predicted optimal welding parameters has a lowest predicted weld distortion, and control the welding apparatus to perform the at least one welding operation according to the determined set of alternative predicted optimal welding parameters having the lowest predicted weld distortion.

In other features, the at least one processor is configured to access scan data of the welded assembly including the first vehicle component and the second vehicle component as captured by the measurement sensor or a post-weld scan sensor, generate a welded assembly CAD assembly according to the scan data of the welded assembly, and calculate a distortion difference according to a comparison between the welded assembly CAD assembly and the adjusted CAD assembly, the distortion difference indicative of a difference between actual distortion in the welded assembly and the predicted weld distortion.

In other features, the at least one processor is configured to supply the distortion difference to the machine learning model to perform reinforcement learning on the machine learning model.

In other features, the predicted optimal weld parameters include at least one of parameters configured to minimize distortion of a welded assembly including the first vehicle component and the second vehicle component, or parameters configured to minimize a predicted deviation between the welded assembly including the first vehicle component and the second vehicle component and a nominal engineering CAD model.

In other features, the predicted optimal welding parameters include one or more welding parameters and one or more welding operation parameters.

In other features, the one or more welding operation parameters include at least one of a number of tack welds, a location of tack welds, a number of each weld section, a location of each weld segment, a length of each weld segment, or a direction of each weld segment.

In other features, the welding apparatus includes a gas metal arc welding (GMAW) welding apparatus, and the one or more welding parameters include at least one of a weld amperage, a weld volume, a weld frequency a travel speed, a weave schedule, a work distance, a work angle, a travel angle, a joint root offset, a shielding gas type, a shielding gas flow rate, a filler wire type or a filler wire diameter.

In other features, the input parameters for the machine learning model include at least one of metal combinations of the first vehicle component and the second vehicle component, a total weld length per area or block, a ratio of yield strength in materials of the first vehicle component and the second vehicle component, or a ratio of thickness in in materials of the first vehicle component and the second vehicle component.

In other features, the at least one processor is configured to calculate a residual stress of the first vehicle component and the second vehicle component using finite element analysis, based on the adjusted CAD assembly.

In other features, the input parameters include at least one of dimensional measurements of the first vehicle component and the second vehicle component as scanned by the measurement sensor, or a dimensional deviation between a nominal engineering CAD model and the first vehicle component and the second vehicle component as scanned by the measurement sensor.

In other features, the measurement sensor includes at least one of a camera, a point-scanning sensor, or a line-scanning laser.

In other features, the mechanical handling device includes at least one of a conveyor, a pick and place module, a robot, a part holding fixture, a part nest, a table, and a robot gripper.

In other features, the welding apparatus includes a robotic welding torch and a part holding fixture.

In other features, the welding apparatus includes a robotic fixtureless assembly having one or more robots configured to hold the first vehicle component and the second vehicle component together for assembly.

A method for welding vehicle component assemblies includes scanning, via a measurement sensor, a first vehicle component and a second vehicle component on a mechanical handling device to generate scan data, generating a scanned CAD assembly of the first vehicle component and the second vehicle component according to the scan data, and obtaining input parameters for a machine learning model configured to output predicted optimal welding parameters, the input parameters associated with one or more features of the first vehicle component and the second vehicle component. The method includes generating predicted optimal welding parameters, using the machine learning model, based on the scanned CAD assembly and the input parameters, and controlling a welding apparatus to perform at least one welding operation on the first vehicle component and the second vehicle component according to the predicted optimal welding parameters.

In other features, the method includes accessing a virtual design CAD assembly of the first vehicle component and the second vehicle component, and determining an adjusted CAD assembly based on a combination of the scanned CAD assembly and the virtual design CAD assembly, the adjusted CAD assembly indicative of one or more manufacturing differences between the first vehicle component and a specified virtual design of the first vehicle component, and between the second vehicle component and a specified virtual design of the second vehicle component. Generating the predicted optimal welding parameters includes generating the predicted optimal welding parameters based on the adjusted CAD assembly.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
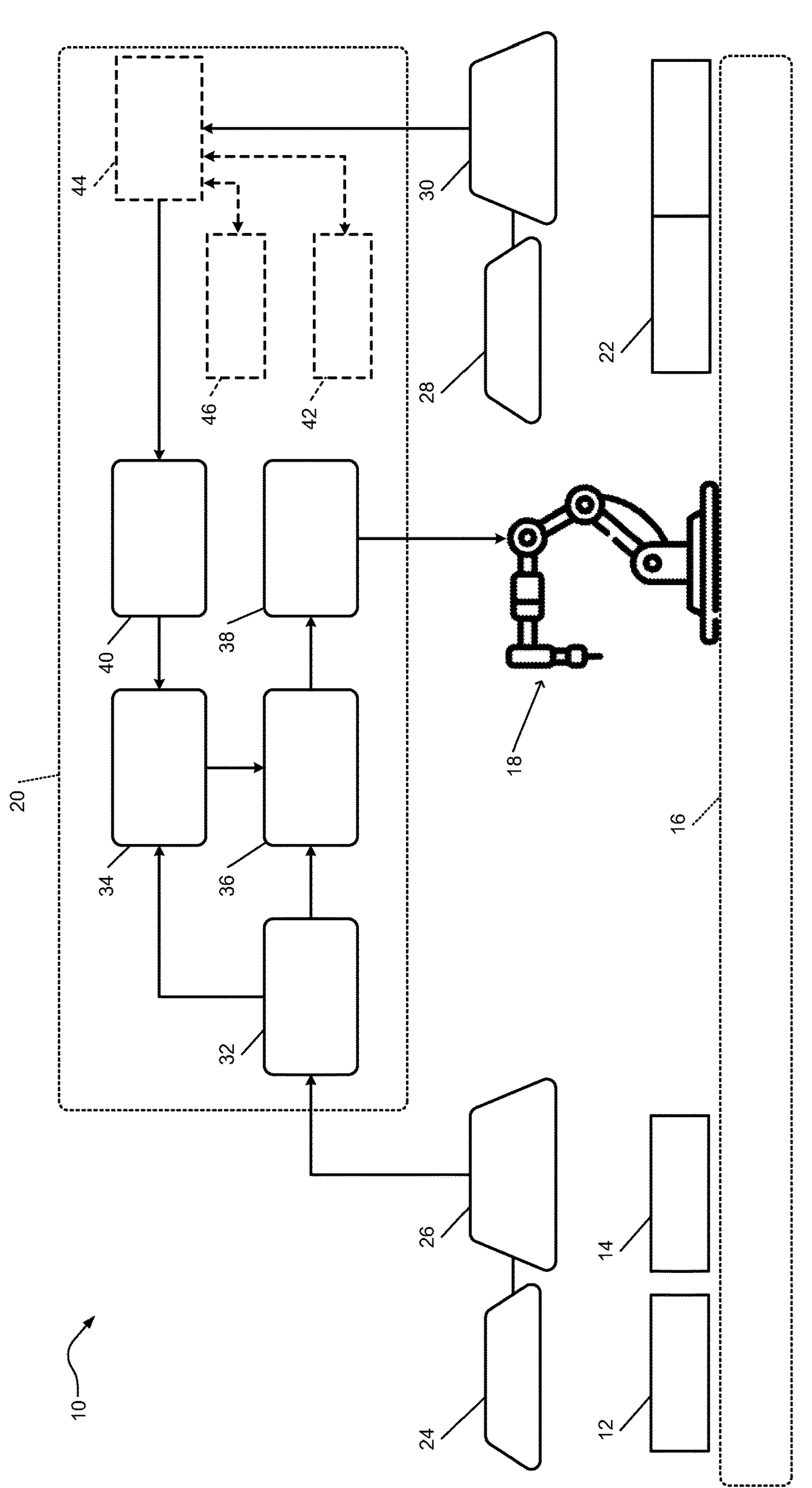
FIG. 1 is a block diagram of an example system for welding vehicle component assemblies.

While welding systems and methods are described herein in the context of vehicle components and vehicle assemblies, the welding systems and methods can be used in other applications.

The incoming vehicle component parts in a vehicle welding assembly process may have dimensional variations (e.g., due to manufacturing variation, different suppliers, variation in material properties, stamping springback, etc.). Furthermore, the assembly process itself may introduce additional dimensional variation in the assembly (e.g. due to variation in part-to-part locating, thermally induced weld distortion, varying welding parameters, etc.). The combination of variation in incoming components and the in the assembly process may result in different dimensional variations and welding distortions of the vehicle components, and in the welded assembly, during a welding process. Due to the complex nature of these variations and interactions in the assembly, and costs of production trials, welding process planning and welding parameters are generally developed based on limited lab trials, limited production statistical process control (SPC), and limited human-based finite element analysis (FEA) process simulation.

There are not currently any systematic, automated, intelligent, self-tuning, or closed-loop methods for addressing dimensional variations and thermal distortions of vehicle component dimensions during a vehicle assembly welding process. Some example embodiments herein may prove a method to control weld distortion for vehicle components having various manufacturing dimension differences, to improve weld quality and welded product performance.

In various implementations, an artificial intelligence (AI) based welding tool (such a trained machine learning model in a weld distortion modeling solver), may be configured to predict optimal welding parameters and weld planning for a vehicle component welding process, to mitigate weld distortion for vehicle components having dimensional variations. The AI tool may leverage supervised or unsupervised learning algorithms.

For example, a supervised algorithm may be developed based on FEA simulation and expert domain knowledge, then then reinforcement learning may be integrated to update the initially trained supervised algorithm based on results of actual weld distortion measured for components that have gone through a welding process. The actual weld distortion may be calculated as a deviation in distortion of the actual post-weld assembly from a nominal distortion.

The AI tool may utilize dimensional variation of an incoming vehicle component (e.g., as scanned by one or more lights and measurement sensors on a mechanical handling device), to optimize the weld process, which may include gap filling as necessary to meet a weld size and mitigation distortion of vehicle components during welding. The system may develop a virtual computer-aided design (CAD) assembly based on the scan of individually scanned vehicle components, and combine the virtual CAD assembly with optimized weld process planning, clamping and materials properties of the vehicle components, in order to predict a weld distortion of each welded assembly.

In various implementations, an intelligent optimized welding solution (e.g., a trained machine learning model), may output welding parameters, welding operating parameters and/or robot positioning parameters, in order to minimize component distortion for each individual weld assembly. For example, may refer to welding amperage (e.g., electrical current), welding voltage, travel speed, a weave schedule, a work distance, a work angle, a travel angle, a joint root offset, a shielding gas type, a shielding gas flow rate, a filler wire type or a filler wire diameter, etc. In some example embodiments, a GMAW controller may be configured to control weld current, voltage, and frequency.

"Welding operating parameters" may refer to, for example, a number of tack welds, a number of weld segments, a direction of welding, an amount of delay between welding, locations of tack welds, a weld sequence, etc. "Robot positioning parameters" may refer to, for example, parameters for robot positions in a robotic fixtureless assembly system that allows for programmatic control over the relative position and alignment of the components in the assembly.

The system may be configured to integrate an estimated residual stress in a modeling solver for each vehicle component, and the quantity may be calculated using elastic/plastic materials properties.

In some example embodiments, incoming vehicle component parts of a given vehicle weld assembly are scanned (e.g., by one or more lights, measurement sensors, etc.) in order to determine dimensional variations for each individual component, and a full CAD assembly of individual parts may be built-up based on 3D point cloud data. After that, adjusted CAD assemblies of individual components may be built up based on differences between a virtual design CAD assembly (such as an ideal component design as originally created by an engineer for the component), and the full CAD assembly built-up based on the scan of the incoming vehicle component (e.g., a vehicle coming down a mechanical handling device to be welded).

In order to accommodate residual stresses due to dimensional variations of individual incoming parts (e.g., a gap between sheets), the residual stress may be calculated according to an applied force required to close the gap, and elastic-plastic properties of materials used in the vehicle components. The residual stress may be integrated in finite element analysis (FEA) during meshing of CAD assemblies for individual component weld assemblies.

Next, a machine learning model may receive input parameters including a CAD assembly of the vehicle components, metal combinations in the vehicle components to be welded, a total weld length per area/block, a ratio of yield strength in materials combinations of the vehicle components to be welded, a ratio of thickness in materials combinations vehicle components to be welded, etc.

The machine learning model may be configured to output predicted welding parameters and welding operating parameters for an FEA solver including, for example, a location of each weld tack/seam, a direction of each weld tack/seam, a sequence of each weld tack/seam, a weld schedule of each weld tack/seam, a number of an assigned gas metal arc welding (GMAW) robot, etc. Any suitable type of welding process may be used, including but not limited to GMAW, laser welding, metal inert gas (MIG) welding, laser brazing, etc.

Gas metal arc welding (GMAW), which may include metal inert gas (MIG) and metal active gas (MAG), may include a welding process in which an electric arc forms between a consumable MIG wire electrode and the workpiece metal(s), which heats the workpiece metal(s), causing them to fuse (melt and join). Along with the wire electrode, a shielding gas may feed through the welding gun, which shields the process from atmospheric contamination.

The process may be semi-automatic or automatic. A constant voltage, direct current power source may be used with GMAW, but constant current systems, as well as alternating current, may also be used. Example methods of metal transfer in GMAW may include globular, short-circuiting, spray, and pulsed-spray.

The FEA solver may be configured to perform weld distortion modeling, and provide distortion modelling output results including, for example, a magnitude of distortion in each location, an accumulative density of distortions, a distance between locations of distortions, etc.

If the modeled weld distortions are below a specified weld distortion threshold (e.g., one or more user defined maximum allowable distortion values), then a weld path may be generated for each weld and translated with respect to a welding assembly robot/fixture frame of reference. New robot positioning and start/stop of the welding process may be generated, such as in a text document, and may be uploaded to a weld controller along with welding parameters in each robot position.

After welding of the assembly, followed by optional cooling and unclamping, the welded assembly may be scanned (such as by one or more lights or measurement sensors). In some example embodiments, cooling may not be feasible (such as high volume production). Distortion of the welded assembly may be calculated by comparing the CAD assembly for the vehicle components created before welding, and a CAD assembly created based on a scan after welding. The calculated distortion may be inserted into a reinforcement learning algorithm, to improve accuracy of the machine learning model.

As described above, in various implementations a virtual CAD assembly of a vehicle component may be built up based on a scan of individual parts, in order to identify variations in each component in the assembly due to manufacturing, such as stamping, trimming, fixture, etc. Residual stress may be calculated due to a difference between a virtual-design component CAD assembly and the built-up virtual component CAD assembly based on the scan of the actual incoming vehicle component, in order to accommodate the residual stress into FEA meshing.

An AI-based tool (e.g., machine learning model) may be used to determine or predict optimum welding parameters and welding operating parameters, to reduce or minimize distortion of the vehicle components during the welding process. The machine learning algorithm may receive any suitable input parameters for tack and welding sequence determination, including but not limited to a number of stack-ups, a length of each weld segment, a ratio for yield strength of materials combinations of the vehicle components, a ratio for thickness of materials combinations of the vehicle components, a geometry of parts, etc. In some example embodiments, the input parameters may include at least one of dimensional measurements of the first vehicle component and the second vehicle component as scanned by the measurement sensor, or a dimensional deviation between a nominal engineering CAD model and the first vehicle component and the second vehicle component as scanned by the measurement sensor.

The machine learning algorithm may output any suitable parameters for the weld process, including but not limited to a number and location of tacks, a number of each weld segment, a location of each weld segment, a length of each weld segment, a direction of each weld segment, etc. The AI-based tool may determine optimum predicted welding parameters for different weld process plans, such as an amperage, a voltage, a frequency, a travel speed, a wire feed speed, a shielding gas, etc.

In some example embodiments, reinforcement learning may be implemented with the machine learning algorithm, and integrated with an FEA solver based on a difference between the intelligent FEA solver and scans of the welded assembly. The system may include integration of an intelligent welding process planning output from the machine learning algorithm, to robot positioning and a weld controller.

Various implementations described herein may provide one or more advantages, such as reducing or eliminating scraps of the welding process, reducing or eliminating re-works of the welding process, reducing or eliminating a weld destructive test, improving first-time weld quality, improving product performance, reducing welding filler wire consumption, etc. In some example embodiments, a welding parameter list of acceptable welds may grow over time as shifts in manufacturing variation occur, such as tooling wear and tear, fixture variation, material variation, etc. Applying technology described herein to, e.g., different material grades, thicknesses, joint configurations, product designs, etc., may yield an even larger database of welding parameters of acceptable welds. Through the use of machine learning, and validating any unknown post weld scan data, a welding parameter list of acceptable welds may be increased, and may facilitate faster decision making based on pattern recognition (such as compared to computational analysis).

FIG. 1 is a block diagram of an example system for welding vehicle component assemblies. As shown in FIG. 1, the system 10 includes a mechanical handling device 16 (such as a conveyor, pick and place units, robots, etc.) for moving a first component 12 and a second component 14 through a vehicle component welding assembly process. The mechanical handling device 16 may include an apparatus for supporting or fixing the first component 12 and the second component 14, such as a table, a part nest, a part holding fixture, a robot gripper, etc.

The system 10 includes a welding apparatus 18, which may include at least one robot configured to implement one or more welding operations on the first component 12 and the second component 14. For example, the welding apparatus 18 may be configured to perform a GMAW welding process to weld the first component 12 and the second component 14 together to form a welded assembly 22.

The welding apparatus 18 may include any suitable welding arrangement, such as a robotic welding torch and a part holding fixture to hold the components together, or a robotic fixtureless assembly where robots hold the components together for assembly (e.g., as opposed to a part holding fixture). In a robotic fixtureless assembly, the system 10 may be able to not only adjust the welding parameters (e.g., voltage, current, etc.), but the system 10 may also be able to programmatically adjust the relative alignment and position of the parts.

As shown in FIG. 1, a component scan light 24 and a component scan sensor 26 are positioned to scan the first component 12 and the second component 14, e.g., as they move along the mechanical handling device 16, prior to welding by the welding apparatus 18. For example, as incoming vehicle components approach the welding apparatus 18, the component scan light 24 may be configured to shine one or more wavelengths of light on the vehicle components, and the component scan sensor 26 may be configured to capture scan data of the vehicle components.

The component scan sensor may be any suitable measurement sensor, such as a camera, a point-scanning sensor (e.g. laser radar), a line-scanning laser, etc.

In various implementations, the component scan sensor 26 may include one or more cameras that capture images of the first component 12 and the second component 14, laser reflection information of the first component 12 and the second component 14 (such as a LIDAR sensor), etc. The component scan sensor 26 may be in communication with a weld distortion prediction module 20 (e.g., a controller) to provide scan information of the first component 12 and the second component 14.

The weld distortion prediction module 20 may include any suitable processors, memory, etc., configured to execute computer-executable instructions to perform any example methods described herein. As shown in FIG. 1, the weld distortion prediction module 20 includes a CAD component module 32.

The CAD component module 32 may be configured to generate CAD assemblies of the first component 12 and the second component 14, based on, e.g., scan data of the first component 12 and the second component 14 from the component scan sensor 26. For example, scan data from the component scan sensor 26 may be in the form of point-cloud data for generating a CAD assembly, etc. The CAD component module 32 may generate a CAD model of an as-scanned assembly.

In various implementations, the CAD component module 32 may be configured to compare a CAD assembly of the first component 12 based on scan data, with a virtual design CAD assembly indicative of an ideal design of the component (such as an original CAD design of the component as prepared by an engineer). The CAD component module 32 may generate an adjusted CAD assembly that accounts for differences in dimensions of the scan of the first component 12 compared to the virtual design CAD assembly for the component (e.g., differences due to manufacturing tolerances, etc.).

The adjusted CAD assembly may be supplied to a machine learning model module 34 of the controller. For example, the machine learning model may be configured to predict optimal welding parameters to reduce or minimize distortion of the first component 12 and the second component 14 during a welding process of the welding apparatus.

The input to the machine learning model may include the adjusted CAD assembly based on scan data of the first component 12 and the second component 14, so the machine learning model can make a more accurate prediction based on actual dimension of the first component 12 and the second component 14 (which may vary from an ideal component design based on differences in manufacturing, different suppliers, etc.).

The machine learning model may also receive input associated with properties of the first component 12 and the second component 14, such as metal materials in each component, total weld length per area/block, a ratio of yield strengths in materials of the components, a ratio of thickness in materials of the components, etc.

The weld distortion prediction module 20 includes a weld distortion calculation module 36, which is configured to model a predicted distortion of the first component 12 and the second component 14 during a welding operation by the welding apparatus 18. The weld distortion calculation module 36 may be configured to calculate residual stress, meshing, etc., based on the adjusted CAD assembly from the CAD component module 32 which represents the actual scanned dimensions of the first component 12 and the second component 14.

The weld distortion calculation module 36 may be configured to calculate stresses based on actual scanned parts, where the system may know how much force is needed to close a 0.5 mm gap versus a 2 mm gap, etc. The machine learning model may then predict which parameters to use on a 2 mm gap, for a different size gap, etc. This approach may save computational power and time, where it is not practical on the welding assembly line to run a new finite analysis over and over again. In various implementations, a zero-gap CAD assembly may refer to a CAD assembly with residual stress after a force is applied to close a gap between components to be welded.

In various implementations, the weld distortion calculation module 36 may be configured to perform calculations using finite element analysis (FEA). The weld distortion calculation module 36 may be able to model the predicted distortion of the first component 12 and the second component 14 based on a combination of the adjusted CAD assembly from the CAD component module 32 representing the actual scanned dimensions of the first component 12 and the second component 14, calculated residual stress using FEA, and the predicted optimal welding parameters output by the machine learning model module 34.

The predicted optimal welding parameters may include, for example, predicted optimal weld parameters include at least one of parameters configured to minimize distortion of a welded assembly including the first vehicle component and the second vehicle component, or parameters configured to minimize a predicted deviation between the welded assembly including the first vehicle component and the second vehicle component and a nominal engineering CAD model. In various implementations, the weld distortion calculation module may be configured to model a predicted weld distortion of a welded assembly including the first component 12 and the second component 14, after completion of the at least one welding operation, using finite element analysis.

The controller includes a weld robot control module 38, configured to control the welding operation of the welding apparatus 18. For example, the weld robot control module 38 may receive predicted optimal welding parameters output by the machine learning model module 34, and control robot positioning and weld process parameters of the welding apparatus 18 according to the predicted optimal welding parameters. In various implementations, the welding apparatus may include a device/programmable logic controller (PLC) configured to control movement of the welding apparatus 18, a GMAW power source configured to control weld operation of the welding apparatus 18, etc.

The welding apparatus 18 may be configured to weld the first component 12 and the second component 14 according to the predicted optimal welding parameters, to generate a welded assembly 22. The welded assembly 22 may be scanned by the post-weld light scan light 28 and the post-weld scan sensor 30, e.g., as the welded assembly moves down the mechanical handling device after the welding operation of the welding apparatus 18.

In various implementations, the weld distortion prediction module 20 includes a reinforcement learning module 40 configured to receive scan data of the welded assembly 22 from the post-weld scan sensor 30. The reinforcement learning module 40 (or the CAD component module 32) may be configured to generate a post-weld CAD assembly according to the scan of the welded assembly 22.

The post-weld CAD assembly may be compared to the adjusted CAD assembly generated based on scans of the first component 12 and the second component 14, to determine a difference between an amount of actual distortion during the welding operation and a predicted amount of distortion prior to the welding operation.

For example, FIG. 1 illustrates a predicted CAD model 42, a post-weld scanned CAD model 44, and a nominal engineering CAD model 46. The predicted CAD model 42 may be a predicted model of the distorted assembly generated based on, e.g., an output of the weld distortion calculation module 36, and the post-weld scanned CAD model 44 may be generated based on, e.g., data from the post-weld scan sensor 30. A difference between the predicted CAD model 42 and the post-weld scanned CAD model 44 may be fed back to the reinforcement learning module 40, so that predictions may be improved over time.

The nominal engineering CAD model 46 may be a nominal engineering model of the completed assembly (e.g., the welded assembly 22), which may be generated based on, for example, output of the CAD component module 36, nominal engineering CAD models of the components stored in a database, etc. A difference between the nominal engineering CAD model 46 and the post-weld scanned CAD model 44 may be computed in order to verify quality of the as-produced part (e.g., a quality of the welded assembly 22). The computed difference between the nominal engineering CAD model 46 and the post-weld scanned CAD model 44 may be fed back to the reinforcement learning module 40.

The reinforcement learning module 40 may be configured to perform reinforcement learning on the machine learning algorithm of the machine learning model module 34 based on the difference in actual distortion of the welded assembly 22, to improve accuracy of the machine learning model.

In various implementations, a machine learning algorithm may be used to devise complex models and algorithms that lend themselves to prediction. Models generated using machine learning, such as the machine learning model module 34 of FIG. 1, can produce reliable, repeatable decisions and results, and uncover hidden insights through learning from historical relationships and trends in the data.

The purpose of using, for example, a recurrent neural-network-based model, and training the model using machine learning, may be to directly predict dependent variables without casting relationships between the variables into mathematical form. The neural network model includes a large number of virtual neurons operating in parallel and arranged in layers. The first layer is the input layer and receives raw input data. Each successive layer modifies outputs from a preceding layer and sends them to a next layer. The last layer is the output layer and produces output of the system.

In an example fully connected neural network, each neuron in a given layer is connected to each neuron in a next layer. In the input layer, each input node is associated with a numerical value, which can be any real number. In each layer, each connection that departs from an input node has a weight associated with it, which can also be any real number. In the input layer, the number of neurons equals number of features (columns) in a dataset. The output layer may have multiple continuous outputs.

The layers between the input and output layers are hidden layers. The number of hidden layers can be one or more (one hidden layer may be sufficient for most applications). A neural network with no hidden layers can represent linear separable functions or decisions. A neural network with one hidden layer can perform continuous mapping from one finite space to another. A neural network with two hidden layers can approximate any smooth mapping to any accuracy.

The number of neurons can be optimized. At the beginning of training, a network configuration is more likely to have excess nodes. Some of the nodes may be removed from the network during training that would not noticeably affect network performance. For example, nodes with weights approaching zero after training can be removed (this process is called pruning). The number of neurons can cause under-fitting (inability to adequately capture signals in dataset) or over-fitting (insufficient information to train all neurons; network performs well on training dataset but not on test dataset).

Various methods and criteria can be used to measure performance of a neural network model. For example, root mean squared error (RMSE) measures the average distance between observed values and model predictions. Coefficient of Determination (R2) measures correlation (not accuracy) between observed and predicted outcomes. This method may not be reliable if the data has a large variance. Other performance measures include irreducible noise, model bias, and model variance. A high model bias for a model indicates that the model is not able to capture true relationship between predictors and the outcome. Model variance may indicate whether a model is stable (a slight perturbation in the data will significantly change the model fit).

Figure 2:
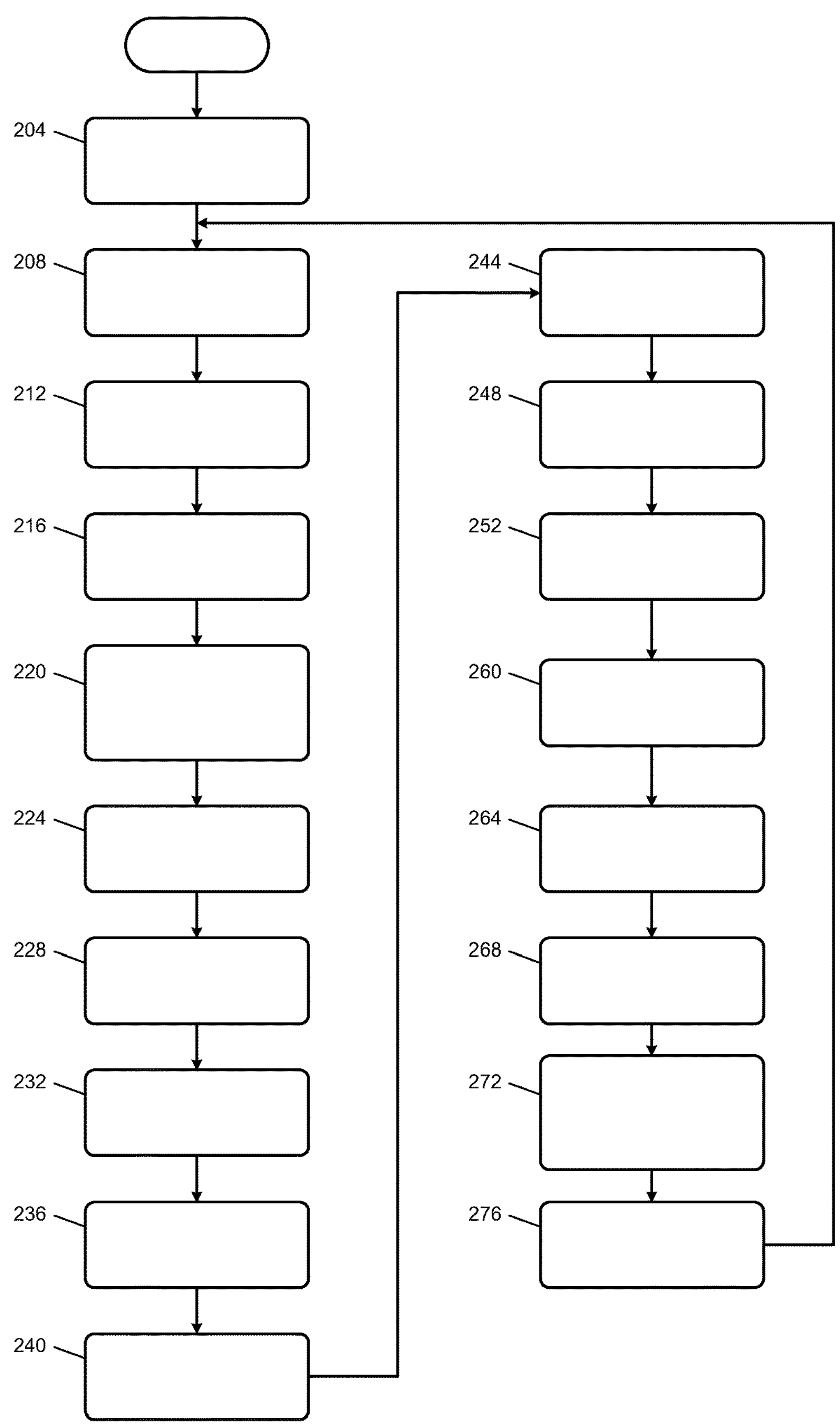
FIG. 2 is a flowchart depicting an example process for welding vehicle assemblies.

FIG. 2 is a flowchart depicting an example process for welding vehicle assemblies. The process may be performed by, for example, the weld distortion prediction module 20 of FIG. 1 executing computer-executable instructions of one or more of the modules illustrated in the weld distortion prediction module 20 in FIG. 1.

At 204, the controller is configured to scan incoming parts for welding. For example, the controller may obtain scan data from the component scan sensor 26, for the first component 12 and the second component 14. The controller then generates, for example, sparse measurement data, point-cloud data, etc. for the component parts based on the scan data, at 208.

At 212, the controller is configured to create a CAD assembly of the scanned component parts. For example, the CAD assembly may be based on scan data from the component scan sensor 26, to represent actual dimensions of the first component 12 and the second component 14.

The controller is configured to obtain a virtual CAD design for the component parts, at 216. For example, the virtual CAD design may include, e.g., ideal designs for the first component 12 and the second component 14 based on an original design from an engineer, etc.

At 220, the controller is configured to build a CAD assembly that identifies differences of the scanned components. For example, the virtual CAD design may be adjusted according to the scanned CAD assembly data, to indicate where dimensions of the first component 12 and the second component 14 are different from the ideal original design, such as due to manufacturing variations, etc. The adjusted CAD assembly may be used by other elements of the system, to more accurately account for dimensions of the first component 12 and the second component 14 to reduce or minimize distortion of the components during welding.

The controller is configured to calculate a residual stress using finite element analysis at 224. At 228, the controller is configured to obtain input parameters for the machine learning model. For example, the input parameters may be associated with specific material properties of the first component 12 and the second component 14, etc.

At 232, the controller is configured to execute the machine learning model to generate welding parameters. For example, the machine learning model module 34 of FIG. 1 may predict optimal welding parameters to minimize distortion of the first component 12 and the second component 14 during welding, based on actual scanned dimension of the components and material properties of the components.

The controller is configured to model a predicted component weld distortion at 236. For example, the weld distortion calculation module 36 may be configured to use finite element analysis to predict distortion of the first component 12 and the second component 14 during welding, based on scanned dimensions of the components, calculated residual stress, the predicted optimal welding parameters from the machine learning model, etc.

At 240, the controller is configured to supply the optimal robot position parameters to the robot controller. For example, the weld robot control module 38 may be configured to supply robot positioning parameters to a device or PLC controller for movement of the welding apparatus 18 of FIG. 1.

The controller is configured to supply optimal welding parameters to the weld controller, at 244. For example, the weld robot control module 38 may supply weld control parameters to a GMAW power source of the welding apparatus 18. At 248, the controller is configured to weld the first component 12 and the second component 14 using the predicted optimal welding parameters output by the machine learning model.

At 252, the controller is configured to scan the welded assembly after cooling and unclamping. For example, the post-weld scan sensor 30 of FIG. 1 may scan the welded assembly 22 after welding by the welding apparatus 18, and the welded assembly has cooled and been released from a clamp.

The controller is configured to build a CAD assembly based on the scan of the welded assembly, at 260. For example, the reinforcement learning module 40 of FIG. 1 may be configured to build a post-weld CAD assembly to determine actual dimensions of the welded assembly 22 after the welding process has completed.

At 264, the controller is configured to compare the post-weld scan CAD assembly to the original scan CAD assembly (e.g., a CAD assembly built up based on the original scan of the first component 12 and the second component 14 prior to welding the components). The controller then calculates an actual weld distortion based on the CAD comparison at 268.

For example, the controller may determine an amount of distortion of the welded assembly 22 that actually occurred during the welding process, to a predicted amount of distortion prior to the welding process. At 272, the controller is configured to perform reinforcement learning of the machine learning model based on the actual weld distortion.

For example, the machine learning model algorithm may be updated based on a difference between the weld distortion predicted based on the predicted optimal welding parameters of the machine learning model, and the actual weld distortion that occurred during the welding process. At 276, the controller is configured to scan the next incoming weld components, and then return to 208 to generate sparse measurement and point-cloud data for the next scanned incoming components.

Figure 3:
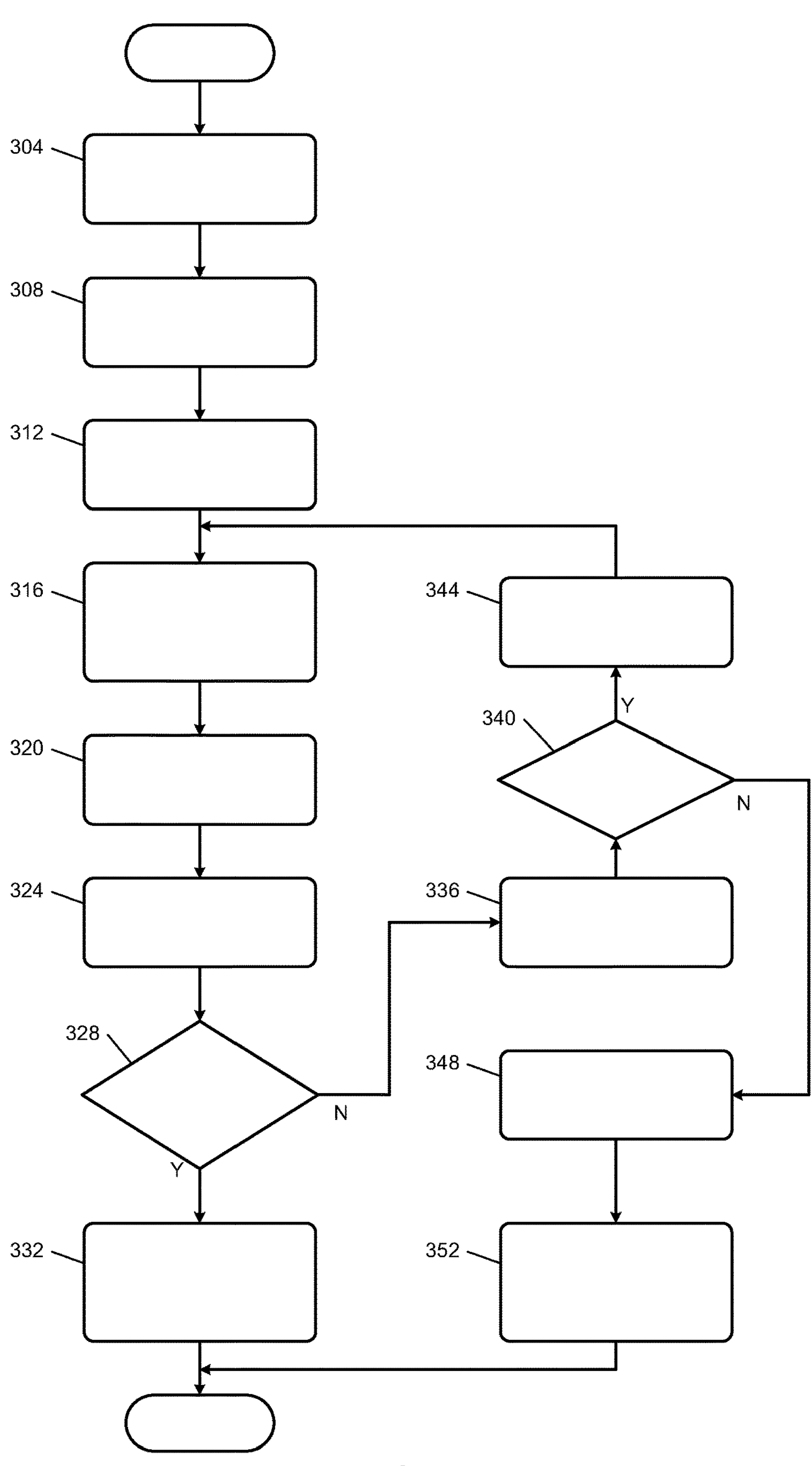
FIG. 3 is a flowchart depicting an example process for using a machine learning model to predict optimal welding parameters.

FIG. 3 is a flowchart depicting an example process for using a machine learning model to predict optimal welding parameters. "Welding parameters" may refer to parameters such as voltage, current, wire feed rate, torch angle, welding speed, etc. At 304, the controller is configured to obtain input parameters for the machine learning model, which may include, for example, various ones of the example model input parameters described herein.

At 308, the controller is configured to obtain a scanned component CAD assembly. For example, the component scan sensor 26 of FIG. 1 may be configured to scan the first component 12 and the second component 14 as they move along the mechanical handling device 16.

The controller is configured to execute the machine learning model at 312, to generate predicted optimal weld sequence parameters. The controller then models component distortion using the predicted optimal welding parameters at 316. For example, the weld distortion calculation module 36 of FIG. 1 may be configured to predict distortion of the first component 12 and the second component 14 that will occur during welding, based on the welding parameters output by the machine learning model algorithm.

At 320, the controller is configured to obtain defined distortion threshold values. For example, an administrator may define specific maximum distortion values that are tolerable for the welding process. Examples of weld distortion threshold values may include, but are not limited to, a magnitude of distortion in each location, an accumulative density of distortions, a distance between distortions, etc.

After comparing modeled distortion values to threshold values at 324, if all of the distortion values are less than the specified threshold values at 328, the controller is configured to perform the component welding using the predicted optimal welding parameters at 332. For example, if the predicted weld distortion based on the output welding parameters from the machine learning model are within acceptable limits, the welding apparatus 18 may be allowed to proceed with welding the first component 12 and the second component 14 according to the output welding parameters from the machine learning model algorithm.

If the controller determines at 328 that one or more of the predicted distortion values based on the output of the machine learning model are greater than a threshold distortion value, the controller is configured to proceed to 336 to obtain a current iteration count. For example, an administrator, etc. may specify a limited number of times that the process is allowed to try new welding parameters to predict distortion as less than a threshold.

If too many iterations are allowed, the system may hold up the manufacturing process while it takes too long to keep looking for other welding parameters that may reduce the predicted weld distortion below the threshold. An example number of allowed iterations may be two, although other embodiments may include more or less allowed iterations.

If the controller determines at 340 that an iteration count is less than the threshold, the controller proceeds to 344 to obtain alternative machine learning model output parameters. For example, the machine learning model may be configured to output multiple candidate sets of predicted optimal welding parameters to reduce or minimize weld distortion of the components.

The controller may be configured to select a next alternative set of parameters if the first output of the machine learning model did not result in a predicted distortion below the threshold values. The controller then returns to 316 to model component distortion using the selected next alternative set of model parameters in order to determine if the resulting distortion would be below the threshold values.

If the controller determines at 340 that the iteration count is below the threshold, the controller is configured to proceed to 348 to determine a minimum distortion amount among all iterations of the machine learning model output parameters. For example, once the controller is no longer allowed to keep trying additional sets of output parameters, the controller may select whichever set of alternative predicted optimal welding parameters resulted in the lowest distortion (even if it was not below the threshold values), and proceed to 352 to perform component welding using the lowest distortion set of output welding parameters from the machine learning algorithm.

Figure 4:
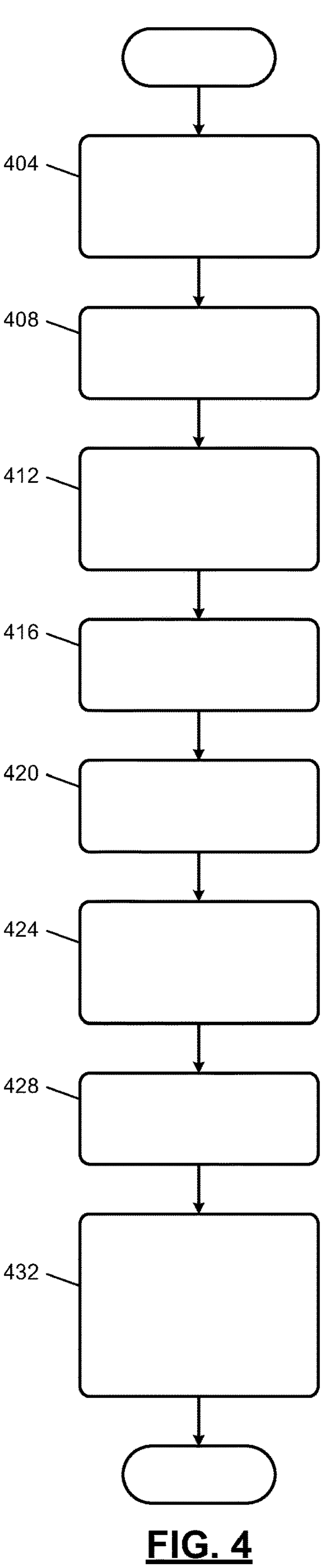
FIG. 4 is a flowchart depicting an example process for performing reinforcement learning for a machine learning model based on scanned welding assembly distortion.

FIG. 4 is a flowchart depicting an example process for performing reinforcement learning for a machine learning model based on scanned welding assembly distortion. At 404, the controller is configured to obtain predicted optimal welding parameters from a machine learning model algorithm.

At 408, the controller is configured to obtain a predicted weld distortion, using finite element analysis. For example, the controller may model applying the predicted optimal welding parameters from the machine learning model to the adjusted CAD assembly representing dimensions of the scanned components, to predict distortion of the actual component dimensions during a welding process using the predicted optimal welding parameters.

At 412, the controller is configured to perform welding on the components using the predicted optimal welding parameters from the output of the machine learning model. For example, the weld distortion prediction module 20 may control the welding apparatus 18 to perform a welding operation according to the predicted optimal welding parameters.

The controller is configured at 416 to scan the welded component assembly, after the welding process is completed. The controller then builds a post-weld CAD assembly at 420 according to the scan data of the welded component assembly after the welding process is completed.

At 424, the controller is configured to calculate actual weld distortion based on the post-weld CAD assembly. The controller is configured to determine a difference between the predicted weld distortion and the actual weld distortion of the welded assembly at 428.

The controller then performs machine learning model reinforcement learning at 432, based on the determined difference between the scanned actual distortion of the welded assembly after welding is complete, and the predicted distortion before the welding operation was initiated.

Figure 5:
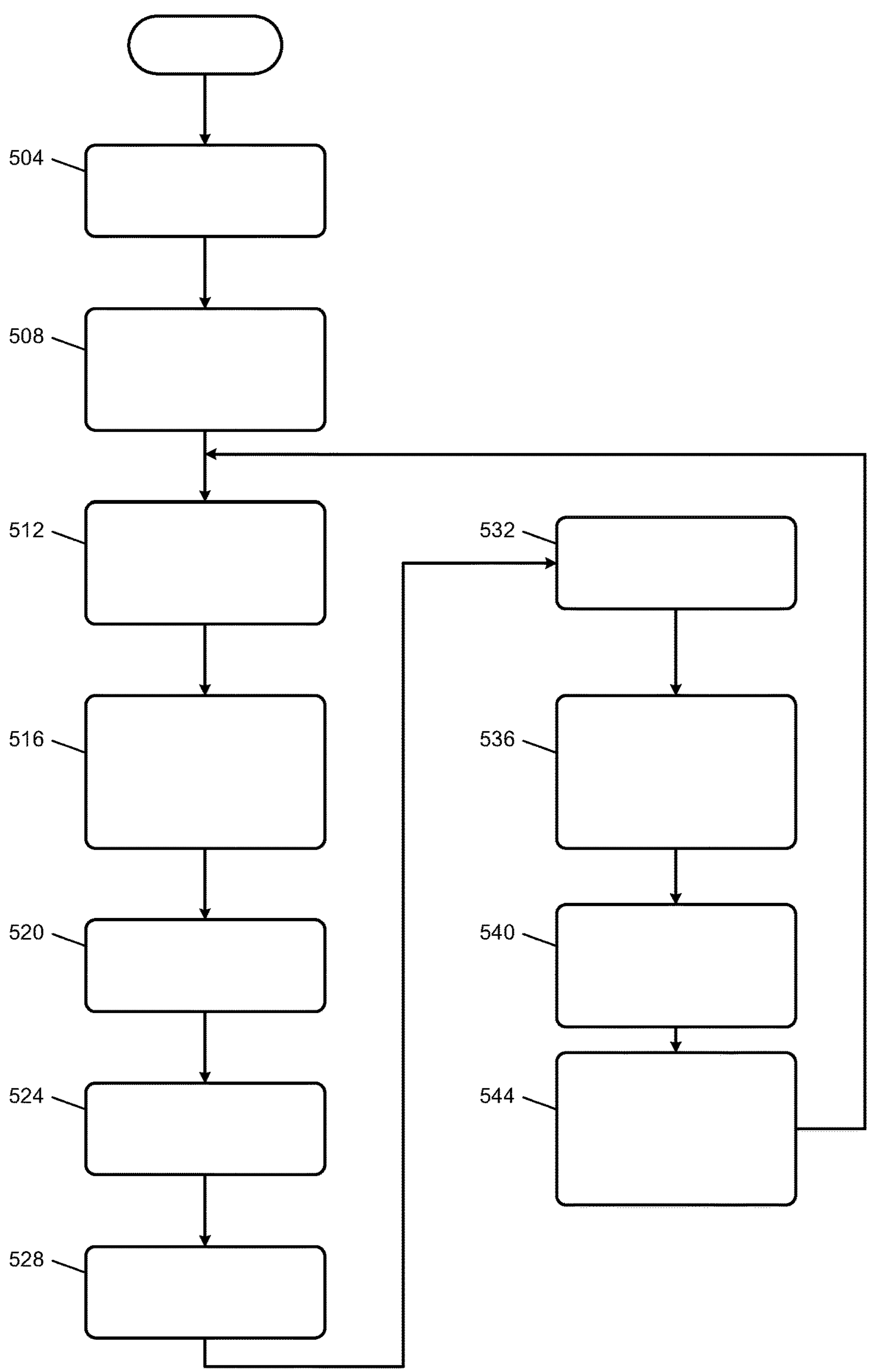
FIG. 5 is a flowchart depicting an example process for controlling a welding apparatus using predicted optimal welding parameters.

FIG. 5 is a flowchart depicting an example process for controlling a welding apparatus using predicted optimal welding parameters. At 504, the controller is configured to obtain a CAD assembly based on a scan of components on a mechanical handling device of the welding system.

At 508, the controller is configured to obtain predicted optimal welding parameters from a machine learning model. The controller then supplies the parameters and the component CAD assembly (based on the scan of the components), to a robot controller at 512. The robot controller may be a PLC, etc.

At 516, the controller is configured to select a robot path from specified programs, based on robot positioning parameters specified by the output of the machine learning model, and the component CAD assembly. The controller then translates a weld path with respect to a robot frame of reference, at 520.

The controller is configured to calculate a new robot positioning and welding start/stop, at 524. For example, the controller may adjust movement of the robot positions and welding locations based on the output parameters from the machine learning model. The updated position program is stored in the robot controller at 528.

At 532, the controller is configured to supply optimal welding parameters to a GMAW controller. The controller then performs component welding at 536 using the determined robot positioning and welding parameters (e.g., the welding apparatus 18 of FIG. 1 may operate based to the determined positioning and welding parameters specified according to output of the machine learning model).

At 540, the controller is configured to obtain a CAD assembly based on a scan of next incoming vehicle components on a mechanical handling device of the welding assembly system. The controller then obtains predicted welding parameters from the machine learning model for the next components on the mechanical handling device at 544, and returns to 512 to supply the predicted optimal welding parameters to the robot controller.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a BLU-RAY DISC optical storage media).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (il) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, OBJECTIVE-C code, SWIFT code, Haskell, GO code, SQL, R, Lisp, Java® code, Fortran, PERL code, Pascal, Curl, OCaml, Javascript® code, HTML5 (Hypertext Markup Language 5th revision), Ada, ASP (Active Server Pages), PHP (PHP: Hypertext Preprocessor), SCALA code, EIFFEL code, Smalltalk, ERLANG code, Ruby, Flash® code, Visual Basic® code, LUA code, MATLAB code, SIMULINK code, and Python® code.

What is claimed is:

1. A system for welding vehicle component assemblies, the system comprising:
- a measurement sensor configured to scan a first vehicle component and a second vehicle component on a mechanical handling device;
- a welding apparatus configured to weld the first vehicle component and the second vehicle component together;
- memory configured to store a machine learning model configured to output predicted optimal welding parameters, virtual computer-aided design (CAD) design data for multiple vehicle components, and computer-executable instructions; and
- at least one processor configured to execute the computer-executable instructions to:
  - access scan data of the first vehicle component and the second vehicle component from the measurement sensor;
  - generate a CAD model of an as-scanned assembly of the first vehicle component and the second vehicle component according to the scan data;
  - obtain input parameters for the machine learning model, the input parameters associated with one or more features of the first vehicle component and the second vehicle component;
  - generate predicted optimal welding parameters, using the machine learning model, based on the CAD model and the input parameters; and
  - control the welding apparatus to perform at least one welding operation on the first vehicle component and the second vehicle component according to the predicted optimal welding parameters.

2. The system of claim 1, wherein the at least one processor is configured to:
- access a virtual design CAD assembly of the first vehicle component and the second vehicle component according to the CAD design data; and
- determine an adjusted CAD assembly based on a combination of the CAD model and the virtual design CAD assembly, the adjusted CAD assembly indicative of one or more manufacturing differences between the first vehicle component and a specified virtual design of the first vehicle component, and between the second vehicle component and a specified virtual design of the second vehicle component;
- wherein generating the predicted optimal welding parameters includes generating the predicted optimal welding parameters based on the adjusted CAD assembly.

3. The system of claim 2, wherein the at least one processor is configured to model a predicted weld distortion of a welded assembly including the first vehicle component and the second vehicle component, after completion of the at least one welding operation, using finite element analysis.

4. The system of claim 3, wherein:
- the at least one processor is configured to compare the predicted weld distortion to one or more specified weld distortion thresholds; and
- controlling the welding apparatus includes controlling the welding apparatus to perform the at least one welding operation in response to the predicted weld distortion being less than the one or more specified weld distortion thresholds.

5. The system of claim 3, wherein the at least one processor is configured to:
- compare the predicted weld distortion to one or more specified weld distortion thresholds;
- obtain a set of alternative predicted optimal welding parameters from the machine learning model in response to the predicted weld distortion being greater than the one or more specified weld distortion thresholds; and
- in response to a number of multiple sets of alternative predicated optimal welding parameters being equal to a specified iteration value:
  - determine which one of the multiple sets of alternative predicted optimal welding parameters has a lowest predicted weld distortion; and
  - control the welding apparatus to perform the at least one welding operation according to the determined set of alternative predicted optimal welding parameters having the lowest predicted weld distortion.

6. The system of claim 3, wherein the at least one processor is configured to:
- access scan data of the welded assembly including the first vehicle component and the second vehicle component as captured by the measurement sensor or a post-weld scan sensor;
- generate a welded assembly CAD assembly according to the scan data of the welded assembly; and
- calculate a distortion difference according to a comparison between the welded assembly CAD assembly and the adjusted CAD assembly, the distortion difference indicative of a difference between the actual distortion in the welded assembly and the predicted weld distortion.

7. The system of claim 6, wherein the at least one processor is configured to supply the distortion difference to the machine learning model to perform reinforcement learning on the machine learning model.

8. The system of claim 2, wherein the at least one processor is configured to calculate a residual stress of the first vehicle component and the second vehicle component using finite element analysis, based on the adjusted CAD assembly.

9. The system of claim 1, wherein the predicted optimal weld parameters include at least one of parameters configured to minimize distortion of a welded assembly including the first vehicle component and the second vehicle component, or parameters configured to minimize a predicted deviation between the welded assembly including the first vehicle component and the second vehicle component and a nominal engineering CAD model.

10. The system of claim 1, wherein the predicted optimal welding parameters include one or more welding parameters and one or more welding operation parameters.

11. The system of claim 10, wherein the one or more welding operation parameters include at least one of a number of tack welds, a location of tack welds, a number of each weld section, a location of each weld segment, a length of each weld segment, or a direction of each weld segment.

12. The system of claim 10, wherein:

the welding apparatus includes a gas metal arc welding (GMAW) welding apparatus; and the one or more welding parameters include at least one of a weld amperage, a weld volume, a weld frequency a travel speed, a weave schedule, a work distance, a work angle, a travel angle, a joint root offset, a shielding gas type, a shielding gas flow rate, a filler wire type or a filler wire diameter.

13. The system of claim 1, wherein the input parameters for the machine learning model include at least one of metal combinations of the first vehicle component and the second vehicle component, a total weld length per area or block, a ratio of yield strength in materials of the first vehicle component and the second vehicle component, or a ratio of thickness in in materials of the first vehicle component and the second vehicle component.

14. The system of claim 1, wherein the input parameters include at least one of dimensional measurements of the first vehicle component and the second vehicle component as scanned by the measurement sensor, or a dimensional deviation between a nominal engineering CAD model and the first vehicle component and the second vehicle component as scanned by the measurement sensor.

15. The system of claim 1, wherein the measurement sensor includes at least one of a camera, a point-scanning sensor, or a line-scanning laser.

16. The system of claim 1, wherein the mechanical handling device includes at least one of a conveyor, a pick and place module, a robot, a part holding fixture, a part nest, a table, and a robot gripper.

17. The system of claim 1, wherein the welding apparatus includes a robotic welding torch and a part holding fixture.

18. The system of claim 1, wherein the welding apparatus includes a robotic fixtureless assembly having one or more robots configured to hold the first vehicle component and the second vehicle component together for assembly.

19. A method for welding vehicle component assemblies, the method comprising:

scanning, via a measurement sensor, a first vehicle component and a second vehicle component on a mechanical handling device to generate scan data;

generating a scanned CAD assembly of the first vehicle component and the second vehicle component according to the scan data;

obtaining input parameters for a machine learning model configured to output predicted optimal welding parameters, the input parameters associated with one or more features of the first vehicle component and the second vehicle component;

generating predicted optimal welding parameters, using the machine learning model, based on the scanned CAD assembly and the input parameters, the predicted optimal welding parameters configured to minimize distortion of the first vehicle component and the second vehicle component during welding; and controlling a welding apparatus to perform at least one welding operation on the first vehicle component and the second vehicle component according to the predicted optimal welding parameters.

20. The method of claim 19, further comprising:

accessing a virtual design CAD assembly of the first vehicle component and the second vehicle component; and determining an adjusted CAD assembly based on a combination of the scanned CAD assembly and the virtual design CAD assembly, the adjusted CAD assembly indicative of one or more manufacturing differences between the first vehicle component and a specified virtual design of the first vehicle component, and between the second vehicle component and a specified virtual design of the second vehicle component;

wherein generating the predicted optimal welding parameters includes generating the predicted optimal welding parameters based on the adjusted CAD assembly.

* * * * *